Patented Apr. 5, 1927.

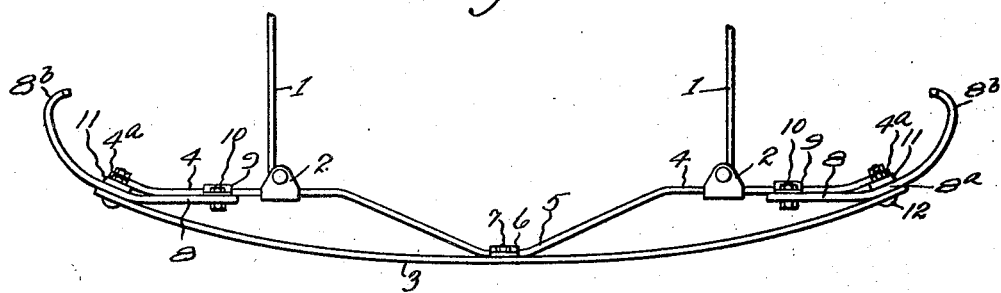

1,623,398

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed June 27, 1925. Serial No. 39,965.

The invention relates to bumpers for automobiles, and more particularly to the general type of bumper comprising parallel upper and lower impact bars, and a rear or auxiliary bar having its ends connected to the first-mentioned bars.

The general object of the invention is to provide a bumper of this character which is simple in construction and economical of production and one which will be adapted for all of the ordinary incidents of use. A further object of the invention is to provide a bumper of this character with extensions, in the nature of attachments, for the protection of fenders.

Further and more limited objects of the invention will appear hereinafter and will be realized by the construction shown in the drawings wherein Fig. 1 represents a plan view of a bumper constructed in accordance with my invention, showing the supporting arms therefor; Fig. 2, a detail in plan, and Fig. 3 a detail in elevation, of one of the ends of the said bumper.

For convenience of description, the bumper will be assumed to be applied to the front end of an automobile and the terms "front" and "rear" will be used to designate the relative locations of the parts of the bumper, but without limiting the use of the latter to either end of the automobile.

Describing the various parts by reference characters, 1 denotes a pair of arms which are adapted to be secured to the side members of an automobile, the said arms being connected at their outer ends, each by a clamp 2, with the rear or auxiliary bar of the bumper, which will now be described.

3, 3 denotes the upper and lower impact bars of the bumper. These bars are convex forwardly and are shown as spaced apart less than the width of the stock of which they are composed. The rear or auxiliary bar comprises transversely extending end portions 4 and a central V-shaped portion 5 which is projected toward and bears against the rear faces of the central portions of the bars 3, this engagement of the bars 5 and 3 being due to the fact that the former bar is wider than the space between the two latter bars. The center of the rear or auxiliary bar is connected to the center of the bars 3 by a clamping plate 6 and bolts 7 securing the said plate to the front bars.

The bumper thus formed is simple and economical of production but does not, in some instances, afford sufficient protection for the fenders—especially when used on the rear of an automobile. When desirable to secure such additional protection, extensions are applied to the ends thereof. These extensions consist each of a pair of short bars secured to and against the opposite ends of the bars 3, the inner ends of the short bars being also secured to the rear or auxiliary bars. Each short bar comprises an inner portion 8 which is adapted to be secured to the outer portion 4 of the rear or auxiliary bar, by means of a clamping plate 9 and bolts 10 extending through the ends of said plate and the parts 8 of the extension bars. The extension bars 8 are so shaped at their outer portions as to bear against the rear faces of the outer portions of the bars 3 and to project outwardly and rearwardly therefrom, the bearing parts being indicated at $8^a$ and the curved extensions being indicated at $8^b$. The extreme ends of the rear or auxiliary bar are deflected rearwardly, as indicated at $4^a$, to provide a space between such portions and the adjacent portions $8^a$ of the extension bars for the reception of clamping plates 11. The ends of the bars 3 and the parts $4^a$ and $8^a$ are connected by bolts 12 extending through the ends of the plates 11 and through the parts $8^a$ and by center bolts 13 securing the outer end of each rear or auxiliary bar to the said plate 11.

The bumper described and shown herein is simple in construction, is easily assembled, and may be produced economically under quantity production.

Having thus described my invention, what I claim is:—

1. A bumper comprising a pair of vertically spaced front or impact bars and a rear or auxiliary bar, extension bars additional to the first three bars and interposed between the ends of the front or impact bars and the ends of the rear or auxiliary bar and secured to the said bars, with the extension bars projecting beyond the ends of the impact and auxiliary bars.

2. A bumper comprising a pair of vertically spaced front or impact bars and a rear or auxiliary bar, and extension bars additional to the first three bars and secured to the impact and auxiliary bars and projecting beyond the ends of such bars.

3. A bumper comprising a pair of vertically spaced front or impact bars and a rear or auxiliary bar, extension bars additional to the first three bars and interposed between the ends of the front or impact bars and the ends of the rear or auxiliary bar and secured to the said bars, with the extension bars projecting beyond the ends of the impact and auxiliary bars and being curved rearwardly and inwardly therefrom.

4. A bumper comprising a pair of vertically spaced front or impact bars and a rear or auxiliary bar, extension bars additional to the first three bars and secured to the said impact bars and projecting beyond the ends thereof and being curved rearwardly and inwardly therefrom.

5. A bumper comprising a vertically spaced pair of front or impact bars and an auxiliary bar, the ends of the first mentioned bars being spaced from the corresponding ends of the auxiliary bar, extension bars for the ends of the impact bars bearing against the rear faces of such impact bars, clamping plates engaging the rear faces of the extension bars and interposed between the same and the corresponding ends of the auxiliary bars, means including the said clamping plates for securing the extension bars to the impact bars, and means for securing the ends of the auxiliary bar to the clamping plates.

6. A bumper comprising a vertically spaced pair of front or impact bars and an auxiliary bar, extension bars for the ends of the impact bars and additional thereto and bearing against such impact bars, clamping plates, means including the said clamping plates for securing the extension bars to the impact bars, and means for securing the ends of the auxiliary bar to the clamping plates.

7. A bumper comprising a pair of vertically spaced impact bars and a rear or auxiliary bar having its ends spaced rearwardly from the ends of the impact bars, an extension bar for each end of each impact bar, each extension bar having a portion adapted to bear against the rear face of its cooperating impact bar and a portion extending inwardly therefrom, a clamping plate interposed between each end of the auxiliary bar and the rear faces of the extension bars, means including the said clamping plates for securing the extension bars to their respective impact bars, means for securing the ends of the auxiliary bar to said clamping plates, and a clamping plate securing the inner end of each extension bar to the auxiliary bar.

8. A bumper comprising a pair of vertically spaced impact bars and a rear or auxiliary bar, an extension bar for each end of each impact bar, each extension bar having a portion adapted to bear against its cooperating impact bar and a portion extending inwardly therefrom, a pair of clamping plates, means including the said clamping plates for securing the extension bars to their respective impact bars, means for securing the ends of the auxiliary bar to said clamping plates, and a clamping plate securing the inner end of each extension bar to the auxiliary bar.

9. A bumper comprising a front or impact bar and a rear or auxiliary bar, and extension bars additional to the first two bars and secured to and between the ends of such bars and projecting beyond such ends.

10. A bumper comprising a front or impact bar and a rear or auxiliary bar, and extension bars additional to the first two bars and secured to the ends of such bars and projecting beyond such ends.

11. A bumper comprising a front or impact bar and a rear or auxiliary bar, and a pair of extension bars each secured at its inner end to an intermediate portion of the rear or auxiliary bar and to the ends of said front or impact bar and rear or auxiliary bar, each extension bar projecting beyond the corresponding ends of the two first mentioned bars.

12. A bumper comprising a front or impact bar and a rear or auxiliary bar, and a pair of extension bars each secured at its inner end to an intermediate portion of the rear or auxiliary bar and to an end of said rear or auxiliary bar, each extension bar projecting beyond the corresponding ends of the two first mentioned bars.

In testimony whereof, I hereunto affix my signature.

WAYNE E. DUNSTON.